United States Patent
Knibbe et al.

(10) Patent No.: US 8,866,619 B2
(45) Date of Patent: Oct. 21, 2014

(54) PRESENCE DETECTION SYSTEM AND LIGHTING SYSTEM COMPRISING SUCH SYSTEM

(75) Inventors: Engel Johannes Antonius Knibbe, Heeze (NL); Roger Peter Anna Delnoij, Lommel (BE); Mareike Klee, Straelen (DE); Willem Franke Pasveer, Dordrecht (NL); Biju Kumar Sreedharan Nair, Veldhoven (NL); John Brean Mills, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 82 days.

(21) Appl. No.: 13/576,960

(22) PCT Filed: Jan. 28, 2011

(86) PCT No.: PCT/IB2011/050383
§ 371 (c)(1),
(2), (4) Date: Aug. 3, 2012

(87) PCT Pub. No.: WO2011/098931
PCT Pub. Date: Aug. 18, 2011

(65) Prior Publication Data
US 2012/0299733 A1    Nov. 29, 2012

(30) Foreign Application Priority Data
Feb. 9, 2010    (EP) .................................... 10153063

(51) Int. Cl.
*G08B 23/00* (2006.01)
*H05B 37/02* (2006.01)

(52) U.S. Cl.
CPC .......... *H05B 37/0227* (2013.01); *H05B 37/029* (2013.01); *Y02B 20/44* (2013.01)
USPC ................ 340/573.1; 340/573.4; 340/426.22; 340/506; 340/604

(58) Field of Classification Search
CPC ....................................................... H05B 37/029
USPC ............... 340/573.1, 573.4, 426.22, 506, 604
See application file for complete search history.

(56) References Cited

U.S. PATENT DOCUMENTS 5,656,995 A    8/1997    Peters
5,781,108 A    7/1998    Jacob et al.
(Continued)

FOREIGN PATENT DOCUMENTS

WO    2009003279 A1    1/2009

OTHER PUBLICATIONS

Michael C. Mozer; "Lessons From an Adaptive Home", University of Colorado.

*Primary Examiner* — Tai T Nguyen

(57) ABSTRACT

A presence detection system (1) for detecting a presence of an object (3), particularly a person or an animal or vehicle, within an area (5) divided in detection zones (9A;9B;9C;9D) covering the area. The system comprises a movement detection device (11A;11B;11C;11D) for detecting a movement of the object. The system further comprises an electronic processing device (13) for storing information relating to a position of the object in a zone-wise way, based on a detected movement of the object. The electronic processing device is configured for determining the presence of the object within the area based on a detected movement of the object and stored information relating to the position of the object. The system is highly sensitive and highly prevents false presence detections. The invention also relates to a method for presence detection, and a lighting system comprising the presence detection system.

7 Claims, 4 Drawing Sheets

(56) References Cited

U.S. PATENT DOCUMENTS

| | | |
|---|---|---|
| 6,909,921 B1 | 6/2005 | Bilger |
| 6,912,429 B1 | 6/2005 | Bilger |
| 7,764,167 B2 * | 7/2010 | Reeves et al. ............ 340/426.22 |
| 7,843,323 B2 * | 11/2010 | Lim et al. ...................... 340/506 |
| 2004/0183667 A1 * | 9/2004 | Nicoletti et al. .............. 340/506 |
| 2005/0151644 A1 | 7/2005 | Roche et al. |

* cited by examiner

PRESENCE DETECTION SYSTEM AND LIGHTING SYSTEM COMPRISING SUCH SYSTEM

FIELD OF THE INVENTION

The invention relates to a presence detection system for detecting a presence of an object, particularly a person or an animal, within an area having a plurality of detection zones. The system comprises a movement detection device for detecting a movement of the object.

The invention also relates to a method for detecting a presence of an object, and to a lighting system that comprises the presence detection system.

BACKGROUND OF THE INVENTION

In lighting applications dedicated to switching on and off lights in a room a lack of sensitivity of presence detection systems comprising passive infrared sensors leads to a false switching off of the lights. This is highly irritating for a person present in the room. For example the lights can be switched off if the person is still sitting and just typing, i.e. making only some minor movements. The well known "waving" is then needed to switch the lights on again. This problem is resolved in the art by using presence detection systems that use a sensor of a high sensitivity in order to detect also the small movements of the person. For example ultrasound sensors in combination with passive infrared sensors can be used. Such systems are for example able to detect the person who is sitting behind a personal computer. Thus the person is not making any major movements, only minor movements. Using such highly sensitive sensors delivers another disadvantage. In particular, because of the high sensitivity of the sensor, the sensor sometimes concludes the person's maintained presence while no person is present in the room. For example, a plant's leaf movement can cause a false conclusion of presence of the person in the room and consequently the lights will remain on. Moreover, using two sensors, the ultrasound sensor in combination with passive infrared sensor, is relatively expensive.

SUMMARY OF THE INVENTION

It is an object of the present invention to provide a system that is highly sensitive and highly prevents a false presence detection of an object, particularly a human being, an animal or a vehicle. The invention is defined by the independent claims. The dependent claims define advantageous embodiments.

According to the invention, a presence detection system for detecting a presence of an object, particularly a person or an animal, within an area having a plurality of detection zones, comprises a movement detection device for detecting a movement of the object. The system comprises an electronic processing device for storing information relating to a position of the object in a zone-wise way, based on the movement of the object, detected by the movement detection device. The electronic processing device is configured for determining, in a zone-wise way, the presence of the object within the area based on a detected movement and stored information relating to the position of the object in a zone-wise way.

The system according to the invention solves the problem of the prior art since no high sensitive sensor in combination with the passive infrared sensor is needed. Instead, the presence of the object is based on detected movement of the object and stored information relating to the position of the object, thus not requiring additional sensors and also not requiring constant and highly sensitive presence detection in the area.

An embodiment of the system according to the invention has the feature that the area is situated in a room. The room may be e.g. an office, a room in a house, a warehouse or a shop.

An embodiment of the system according to the invention has the feature that the area is an outdoor area and the object is a vehicle, in particular a car. For example, such presence detection system is used for determining the presence of the car in the outdoor area which outdoor area can be in a neighborhood of a house.

An embodiment of the system according to the invention has the feature that the movement detection device comprises sensors, wherein each zone has a dedicated sensor. An advantage of this embodiment is that each of the sensors scanning one of the areas can be independently configured.

An embodiment of the system according to the invention has the feature that the movement detection device comprises a sensor, wherein the zones are scanned by the sensor one by one. Thus, it is not needed to have a dedicate sensor for each one of the zones. Instead, one or few sensors can be used. In case of a single sensor, the sensor will be used for the presence detection in the each one of the zones, one at the time.

An embodiment of the system according to the invention has the feature that at least one of sensors is constituted by an ultrasound sensor or an array of ultrasound sensors or a sound sensor or a radar-based sensor or a passive infrared sensor or an optical sensor.

Depending on the purpose of the system the most appropriate sensor is selected.

An embodiment of the system according to the invention has the feature that the area comprises a passage. The zones include at least two zones, i.e. a first zone covering the passage and a second zone adjacent to the first zone. During use of the system, the presence of the object is determined from a first moment in time when a movement in the first zone is detected. The presence of the object is also determined when the movement in one of the other zones is detected. A non-presence of the object is determined when a movement from the second zone to the first zone is detected and thereafter no movement in the first zone is detected for a predetermined period of time. Choosing the predetermined period of time can be dependent on the purpose of the system. For example, the system can allow choosing the predetermined period of time in a range from 1 to 15 minutes. However, in principle an arbitrary length of such a period is possible.

Suppose that the presence detection result of the presence detection system is used as an input for a switch for switching on and off supply of electrical energy of a device when the person's presence or non presence is determined respectively. In such example a lower predetermined period of time will save more electrical energy compared to a higher predetermined period of time. On the other hand, a person could be annoyed if switching off the device is too early.

An embodiment of the system according to the invention has the feature that the movement detection device is operable at a first sensitivity level and a second sensitivity level, wherein the second sensitivity level is higher than the first sensitivity level. During use of the system, the zones are scanned with the first sensitivity level when the object in the relevant zone is not detected and the zone is scanned with the second sensitivity level when the object in said zone is detected. An advantage of this embodiment is that only areas where the person's presence is detected will be scanned with a higher sensitivity. It is an objective of the invention to detect even small movements, for example a person moving a shoulder or typing, in these areas and not to detect such small movements in other areas. Consequently, the probability of false presence detection is decreased since certain other areas will be scanned with a lower sensitivity. That means that e.g. a plant's leaf movement in other areas will not be detected.

An embodiment of the system according to the invention has the feature that the system comprises a self-learning means for determining a zone covering the passage of the area based on an observation where the object presence detection always starts. An advantage of this embodiment is that the system does not need to be extensively configured. Instead, the system will be able to determine itself the zone where the passage is located. Namely that is the zone where the movement is detected first since that is the zone where the person enters the area.

The invention also relates to a method for detecting a presence of an object, particularly a person or an animal, within an area having a plurality of detection zones. The method comprises the step of detecting a movement of the object in one of the zones by a movement detection device. The method comprises also the steps of storing information relating to a position of the object in a zone-wise way by an electronic processing device based on a detected movement of the object, and determining the presence of the object within the area based on a detected and stored information relating to the position of the object in a zone-wise way by said electronic processing device.

An embodiment of the method according to the invention has the feature that the area comprises a passage, wherein the zones include at least a first zone covering the passage and a second zone adjacent to the first zone. The step of determining the presence of the object comprises determining the presence of the object from a first moment in time when a movement in the first zone is detected, determining the presence of the object when the movement in the one of the other zones is detected, and detecting a non-presence of the object when a movement from the second zone to the first zone is detected and thereafter no movement in the first zone is detected for a predetermined period of time.

The method also allows ignoring of movements detected in a zone different than the first zone when there has not been detected any movement in the first zone.

Further the method allows ignoring of movements that start and remain in a certain zone, including people detected in the first zone but not entering the room and thus not passing into the second zone. In this case an optimal positioning of the first zone lies partially outside the room.

An embodiment of the method according to the invention has the feature that at least one of detection zones can be beyond the area. An advantage of this embodiment is that an object will be detected before entering the area, i.e. when the object is approaching the area.

The invention also relates to a lighting system, comprising the presence detection system according to the invention, wherein the presence detection system initiates switching-on of a light of the lighting system when the person's presence is determined and the presence detection system initiates switching-off of the light of the lighting system when the person's non-presence is detected. Such lighting system will provide a significant energy savings since the light will be automatically switched off if non presence is determined.

It is noted that the presence detection system according to the invention can also be used in or combined with e.g. a sound system for generating a sound signal in presence or absence of a person or an alarm system for generating a silent or loud alarm signal in presence or absence of a person.

It is also noted that the presence detection system according to the invention can also be used as a part of a system for opening a door of an area based on the presence detection.

It is also noted that the presence detection system according to the invention can also be used as a part of a system for monitoring an object. Stored information relating to the position of the object in a zone-wise way can be used in such monitoring system.

BRIEF DESCRIPTION OF THE DRAWINGS

In the following, the invention and further aspects will be described, by way of example, and explained hereinafter, using the following figures.

DETAILED DESCRIPTION OF THE EMBODIMENTS

In the following description of the preferred embodiments, reference is made to the accompanying drawings which form a part thereof. Specific embodiments, in which the invention may be practiced, are shown in the following description by a way of illustration. It is also understood that other embodiments may be utilized and structural changes may be made without departing from the scope of the present invention. It is noted that the same reference signs will be used for indicating the same or similar parts in the several embodiments.

Figure 1:
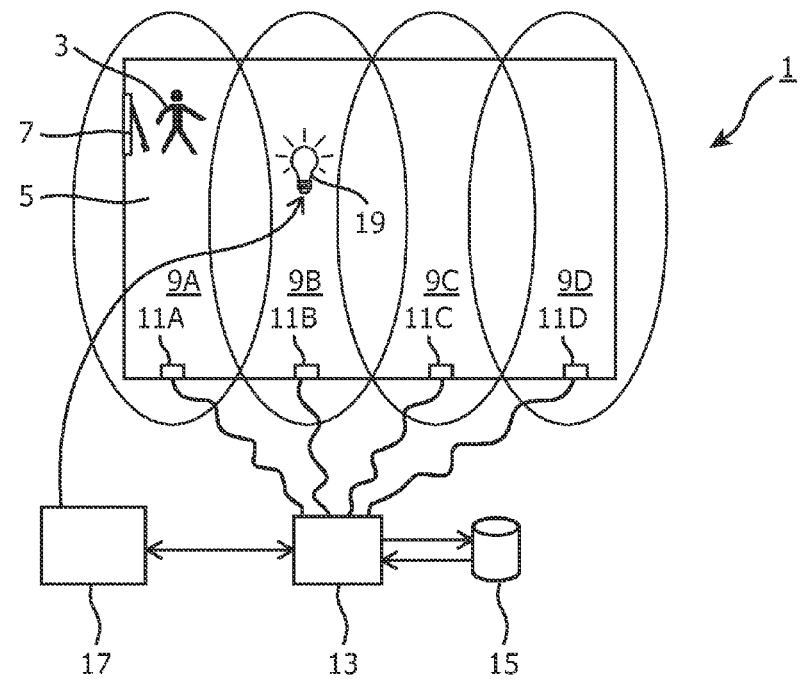
FIG. 1 schematically shows a first exemplary embodiment of the presence detecting system according to the invention and the lighting system according to the invention applied into an area with four zones.

A first embodiment of the invention is shown in FIG. 1. A presence detection system 1 is meant and configured for detecting a presence of an object 3, in particular a living being 3, within an area 5. The object 3 can be a person or an animal. The object can be also a vehicle, in particular a car, in case that the area is an outdoor area. In this example, the area 5 is divided in 4 detection zones 9A;9B;9C;9D which zones together fully cover the area. The area can be covered with any number of zones. The zones do not need to overlap. The set of zones may leave some parts of the area uncovered.

The system comprises a movement detection device 11A;11B;11C;11D for detecting a movement of the object. In this particular case the movement detection device comprises sensors 11A;11B;11C;11D. Each zone 9A;9B;9C;9D has a dedicated sensor 11A;11B;11C;11D respectively. The area 5 can be a room, office, shop or any other suitable space. If the object is an animal, the area could be a space where the animal lives. If the object is a vehicle, the area can be for example an outdoor area close to a garage where the vehicle is parked. The sensor 11 can be any movement detection sensor known in the art. For example, the sensor can be an ultrasound sensor or an array of ultrasound sensors or a sound sensor or a radar-based sensor or a passive infrared sensor or an optical sensor. The presence detection system further comprises an electronic processing device 13 for storing information relating to a position of the object in a zone-wise way based on a detected movement of the object. Suitable electronic processing devices to be used for this purpose are known in the art. Among others the electronic processor device could be a microprocessor or a personal computer, like a device running adequate software, i.e. a program. The electronic processing device receives the detection signals from the sensors 11A; 11B;11C;11D. In the simplest form the detection signal can be a binary signal, wherein for example the binary signal having the value of a logical 1 means that the presence of the object is detected and the value of a logical 0 means that the sensor does not detect the presence of the object. Signals received from the sensors can be for example stored as data by the electronic processing device in a database 15. The electronic processing device is configured for determining the presence of the object within the area based on detected movement of the object and stored information, i.e. the data from the database 15, relating to the position of the object in a zone-wise way, i.e. zone by zone. In the concrete example depicted in FIG. 1 the sensor 11A will detect the person 3 in the area 5, for example the room 5, in the zone 9A and the electronic processing device 13 will store that information into the database 15. If the person 3 later moves from zone 9A into zone 9B, the sensor 11B will detect the presence of the person in the zone 9B. The electronic processing device 13 will store this new information into the database 15. If during a next period of time nothing is detected by sensors 9A and 9C and also nothing is detected by sensor 9B because the person is not making any major movement, the electronic processing device 13 will determine i.e. conclude the presence of the person 3 in the room 5 since according to the concrete configuration it is obvious that the person can leave the zone 9B only via the zone 9A or the zone 9C. So, if nothing is detected by respective sensors 11A and 11C the electronic processing device concludes that the person stays in the zone 9B.

FIG. 1 also shows that room 5 comprises a passage 7, in particular a door 7. The first zone 9A covers the door 7. So, in this concrete example the person 3 will be detected for the first time in the zone 9A when the person enters the room 5 via the door 7. The presence will be concluded also when the movement in the one of the other zones 9B;9C;9D is detected. The person can move through the room and depending on the person's position at least one of the sensors 11A;11B;11C; 11D will detect the person. As shown in FIG. 1 the adjacent zones, for example 9A and 9B, are partly overlapping each other assuring that the whole room 5 is covered by the sensors 11A;11B;11C;11D. The person's non-presence will be concluded when a movement from the second zone 9B to the first zone 9A by the respective sensors 11B and 11A is detected and thereafter no movement in the first zone 9A by the sensor 11A is detected for a predetermined period of time. Said predetermined period of time can be set according to the concrete application of the presence detection system. For example the predetermined period of time can be between 1 to 15 minutes for an office room wherein the presence detection system is used for switching light. The person working in that office room can set desired value for the predetermined period of time. For example someone could like that the light is switched off after one minute after leaving the office room in order to save electrical energy. Someone else, who leaves frequently the office room for relatively short period of time between 3-5 minutes, could desire to switch lights off after 10 minutes, and so on.

In order to improve the total sensitivity of the presence detection system and at the same time to achieve the significant resistance to false detections the movement detection device, i.e. sensors 11A;11B;11C;11D can be operable at a first sensitivity level and a second sensitivity level. The second sensitivity level is higher than the first sensitivity level. During use of the system the zones 9A;9B;9C;9D are scanned with the first sensitivity level when the object 3, for example the person, in the relevant zone is not detected and the zone is scanned with the second, higher sensitivity level when the object in said zone is detected. So, in the concrete example from FIG. 1 only the zone 9A will be scanned with the higher sensitivity level and the zones 9B, 9C and 9D will be scanned with the lower sensitivity level. The lower sensitivity level is chosen in such way that will for sure detect the person walking but it will not detect a movement of the plant's blade. So, the false presence detection in the zones 9B, 9C and 9D is significantly reduced. Once the person moves from the zone 9A to the zone 9B, which will be detected by lower sensitivity level of the sensor 9B, the sensor 9B will switch to the higher sensitivity level and the sensor 9A will switch to the lower sensitivity level.

The presence detection system 1 can further comprise a self-learning means for determining a zone 9A covering door 7 in the room 5 based on an observation where the object's presence detection always starts. Such self-learning means can be implemented by a software program running on the electronic processing device. This program will follow where zone wise the person's presence is concluded for the first time and where zone wise the person's non-presence is concluded. In case of only one door in the room these two zones should be the same zone, which is in example presented in FIG. 1 the zone 9A.

The presence detection system 1 can be a part of a lighting system 17. Such lighting system includes a light source 19, for example a light bulb. The presence detection system can be configured to initiates switching-on of the light when the person's presence is determined and to initiates switching-off of the light when the person's non-presence is detected.

Figure 2:
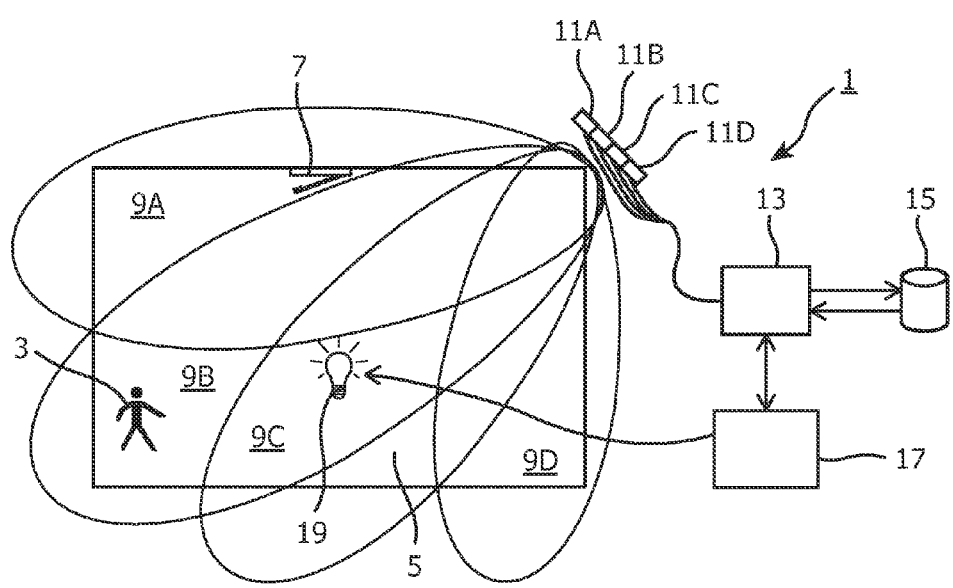
FIG. 2 schematically shows a second exemplary embodiment of the presence detecting system according to the invention with an area with four zones wherein four sensors are placed together.

FIG. 2 schematically shows a second exemplary embodiment of the presence detection system according to the invention. The difference with respect to FIG. 1 is that the sensors 11A;11B;11C;11D are located together, in this concrete example of FIG. 2 in the upper left corner of the room. Any other position, for example at the ceiling in the middle of the room, is possible. As shown if the FIG. 2 the overlapping of the zones 9A;9B;9C;9D can be different with respect to FIG. 1. This is dependent on the position of the sensor. The sensor can be constituted by discrete sensors mounted next to each other for example on a printed circuit board or by discrete sensors mounted in a package together. The sensor can also be an integrated sensor array, wherein several elements are designed in the array. The integrated sensor array can be realized in a silicon substrate, making use of semiconductor and micro-machined technologies. The integrated sensor array can also be realized on other carriers such as glass, ceramic or polymer.

FIG. 3A-3E schematically show a third exemplary embodiment of the system according to the invention, wherein two persons 3A and 3B are entering and leaving the room 5. Thus, the presence detection system is able to detect the presence of more than one person. FIGS. 3A, 3B, 3C, 3D and 3E represent consecutive moments in time.

Figure 3A:
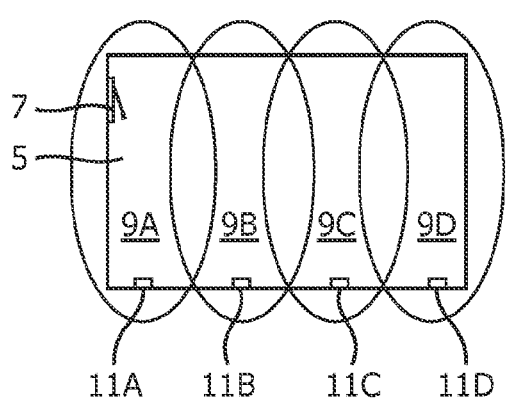
FIGS. 3A-3E schematically show a third exemplary embodiment of the presence detecting system according to the invention with two objects, in this example persons, present in an area.

In the first moment represented by FIG. 3A no person is present in the room 5.

Figure 3B:
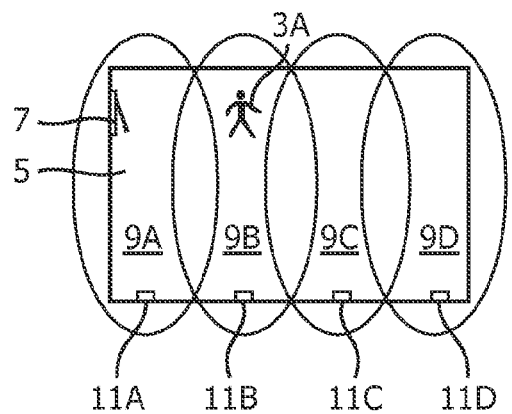

The next moment in time is shown by FIG. 3B. The person 3A first entered the room 5 and walked to the zone 9B. The presence detection system will consequently:
  receive the presence detection signal from sensor 11A when the person 3A entered the room 5 in zone 9A via the door 7, and
  receive the presence detection signal from sensor 11B when the person 3A walked in the zone 9B.

Figure 3C:
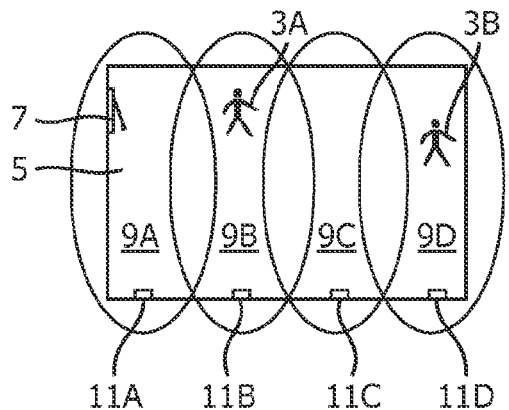

The next moment in time is shown by FIG. 3C. The person 3B entered the room 5 and walked to the zone 9D. The presence detection system will consequently:
  receive the presence detection signal from sensor 11A when the person 3B entered the room 5 in zone 9A via the door 7,
  receive the presence detection signal from sensor 11B when the person 3B walked in the zone 9B,
  receive the presence detection signal from sensor 11C when the person 3B walked in the zone 9C, and
  receive the presence detection signal from sensor 11D when the person 3B walked in the zone 9D.

So, at this moment in time the presence detection system will conclude the presence of two persons 3A and 3B in the zones 9B and 9D respectively.

Figure 3D:
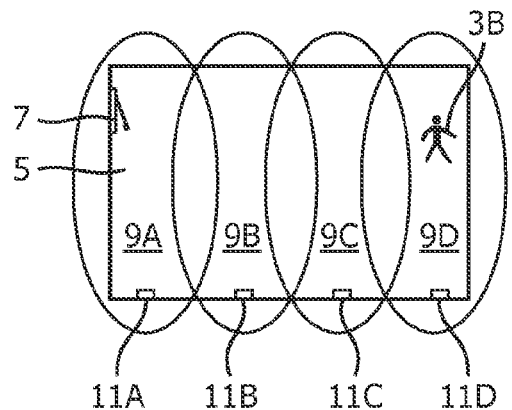

The next moment in time is shown by FIG. 3D. The person 3A left the room 5 via door 7. When the person 3A walked from the zone 9B to the zone 9A the presence detection system will receive the presence detection signal from the sensor 11A and not any more from the sensor 11B. When the person 3A left the room and the zone 9A via the door 7 the presence detection system will not receive the presence detection signal from the sensor 11A anymore. After a predetermined period of time the presence detection system will conclude that the person 3A left the room.

Figure 3E:
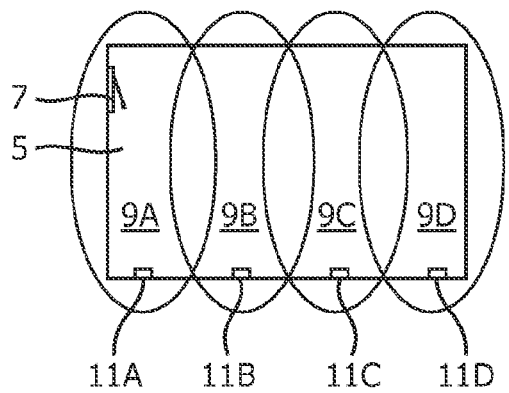

The next moment in time is shown by FIG. 3E. The person 3B left the room 5 via door 7. When the person 3B walked from the zone 9D to the zone 9C the presence detection system will receive the presence detection signal from the sensor 11C and not any more from the sensor 11D. When the person 3B walked from the zone 9C to the zone 9B the presence detection system will receive the presence detection signal from the sensor 11B and not any more from the sensor 11C. When the person 3B walked from the zone 9B to the zone 9A the presence detection system will receive the presence detection signal from the sensor 11A and not any more from the sensor 11B. When the person 3B left the room and the zone 9A via the door 7 the presence detection system will not receive the presence detection signal from the sensor 11A anymore. After a predetermined period of time the presence detection system will conclude that the person 3B left the room.

The next moment in time is shown in FIG. 3E where no person is present in the room 5. In example of using the presence detection system as the part of the lighting system this would be a moment to switch the light off.

Figure 4:
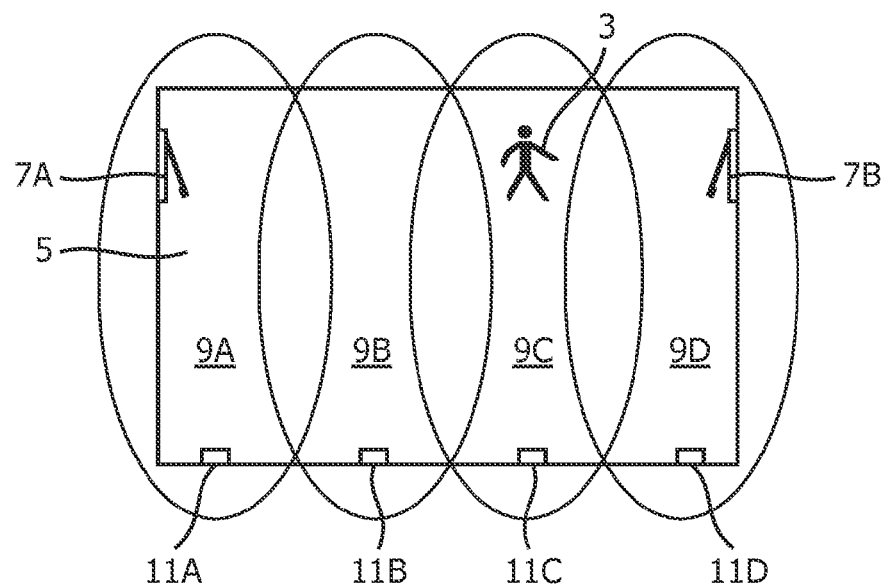
FIG. 4 schematically shows a fourth exemplary embodiment of the presence detecting system according to the invention used into an area provided with two passages, particularly doors.

FIG. 4 schematically shows a fourth exemplary embodiment of the system according to the invention wherein the area 5 comprises two passages 7A;7B i.e. doors. Obviously the person 3 can enter and leave the room via any one of these two doors. The presence detection can start either in the zone 9A or in the zone 9D. In the concrete example according to FIG. 4 in the first case the person 3 entering the room 5 via the door 7A will be detected by sensor 11A in the zone 9A. The person walking to the area 9B and further to the area 9C will be detected by the sensors 11B and 11C respectively. The person's non-presence will be concluded in two ways. The first way: when a movement from the second zone 9B to the first zone 9A by the respective sensors 11B and 11A is detected and thereafter no movement in the first zone 9A by the sensor 11A is detected for a first predetermined period of time. The second way: when the movement from the third zone 9C to the fourth zone 9D by the respective sensors 11C and 11D is detected and thereafter no movement in the fourth zone 9D by the sensor 11D is detected for a second predetermined period of time. The first predetermined period of time and the second predetermined period of time can be the same or can be different depending on concrete requirements. If the concrete example shown in FIG. 4 the person leaves the room via the door 7B the movement from the third zone 9C to the fourth zone 9D is detected by the respective sensors 11C and 11D and when further no movement in the fourth zone 9D by the sensor 11D is detected for a second predetermined period of time the non-presence is concluded by the electronic processing device 13.

Figure 5:
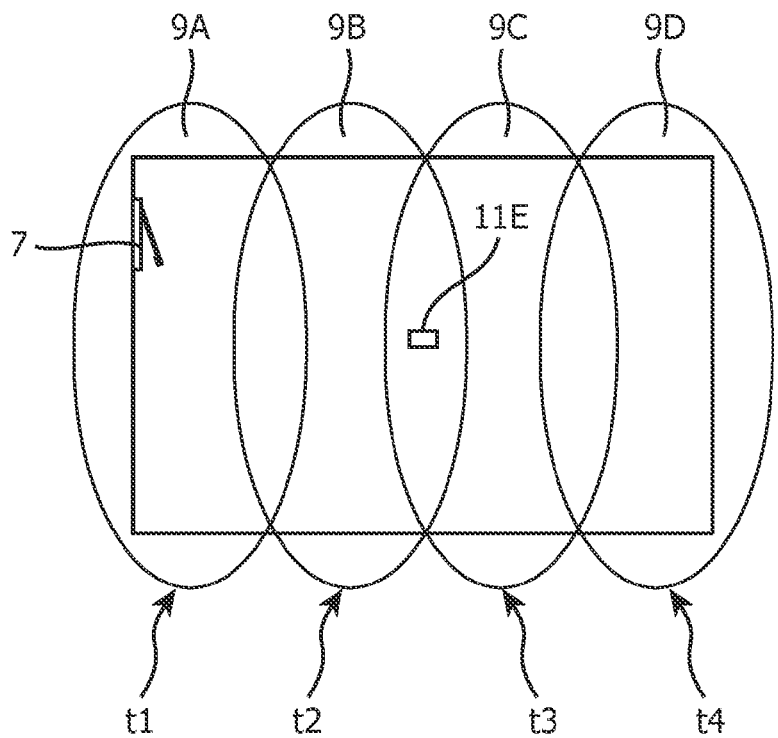
FIG. 5 schematically shows a fifth exemplary embodiment of the presence detecting system according to the invention with an area with four zones wherein a single sensor is used for the presence detection in each one of the four zones, in one of the zones at the time.

FIG. 5 schematically shows a fifth exemplary embodiment of the presence detecting system according to the invention with an area 5 with four zones 9A;9B;9C;9D wherein a single sensor 11E is used for the presence detection in each one of the four zones.

The presence is sensed in one of the four zones at the time. In the example shown in FIG. 5 the sensor 11E sense the presence in the zone 9A at moment t1, in the zone 9B at moment t2, in the zone 9C at moment t3 and in the zone 9D at moment t4. The presence sensing in the four zones is repeated in time. The order of sensing the presence in the zones can be sequential or any other predefined order. A sensing time interval per zone can be also predefined. The sensing time interval can be substantially equal for all zones or can be different per zone. The sensor 11E can be constituted by an ultrasound sensor or an array of ultrasound sensors or a sound sensor or a radar-based sensor or a passive infrared sensor or an optical sensor.

Figure 6:
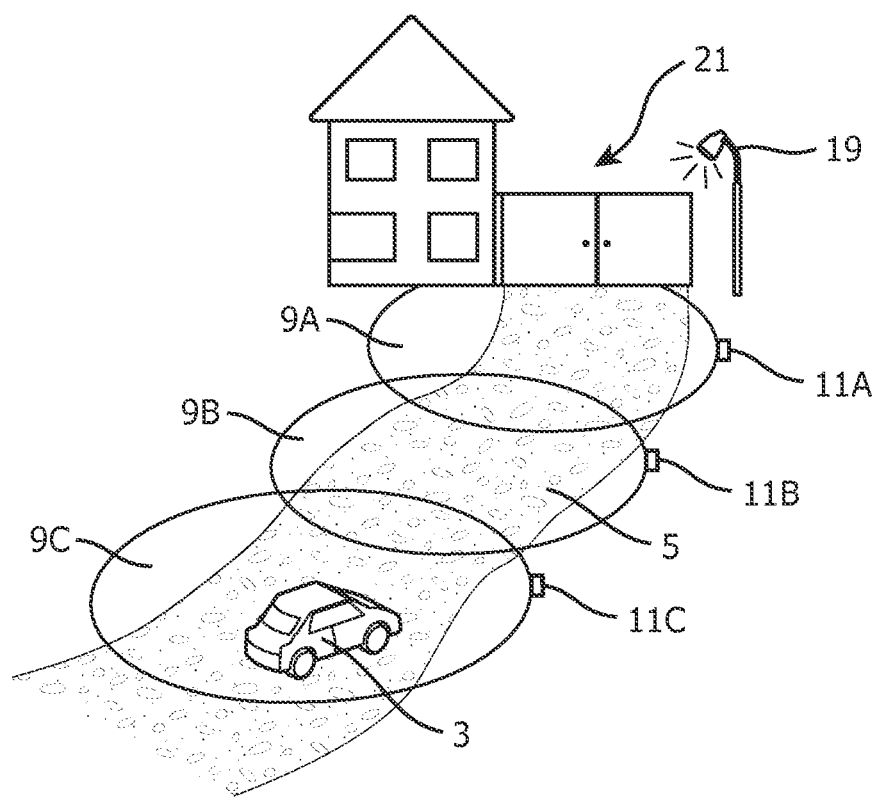
FIG. 6 schematically shows a sixth exemplary embodiment of the presence detecting system according to the invention wherein the area is an outdoor area and the object is a vehicle.

FIG. 6 schematically shows a sixth exemplary embodiment of the presence detecting system according to the invention wherein the area 5 is an outdoor area with three zones 9A;9B;9C and wherein the object it a vehicle, in particular a car 3. In the example shown in FIG. 6, the presence detection system is used to detect a presence of the car that is approaching a garage 21. The sensors 11A;11B;11C sense the car in the zones 9A;9B;9C respectively. The system can be for example configured that the outdoor light 17 is switched on if the presence of the car in the zones 11C, 11B and 11A is sequentially detected.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

List of Reference Numerals
1 A presence detection system
3;3A;3B An object
5 An area
7;7A;7B A passage
9A;9B;9C;9D Detection zones
11A;11B;11C;11D;11E A movement detection device
13 An electronic processing device
15 A database
17 A lighting system
19 A light source
21 A garage

The invention claimed is:

1. A presence detection system for detecting a presence of an object within an area having a plurality of detection zones, the system comprising:
    a movement detection device for detecting a movement of the object, and
    an electronic processing device for storing information relating to a position of the object in a zone-wise way, based on the movement of the object, detected by the movement detection device, wherein the electronic processing device is configured for determining, in a zone-wise way, the presence of the object within the area based on detected movement of the object and stored information relating to the position of the object,
    wherein the area comprises a passage, wherein the zones include a first zone covering the passage and a second zone adjacent to the first zone, and wherein, during use, the presence of the object is determined from a first moment in time when a movement in the first zone is detected and the presence is determined when a movement in one of the other zones of the area is detected, and a non-presence of the object is determined when a movement from the second zone to the first zone is detected and thereafter no movement in the first zone is detected for a predetermined period of time.

2. The system as claimed in claim 1, wherein the movement detection device comprises sensors, wherein each zone has a dedicated sensor.

3. The system as claimed in claim 1, wherein the movement detection device comprises a sensor, wherein the zones are scanned by the sensor one by one.

4. A presence detection system for detecting a presence of an object within an area having a plurality of detection zones, the system comprising:
    a movement detection device for detecting a movement of the object, and
    an electronic processing device for storing information relating to a position of the object in a zone-wise way, based on the movement of the object, detected by the movement detection device, wherein the electronic processing device is configured for determining, in a zone-wise way, the presence of the object within the area based on detected movement of the object and stored information relating to the position of the object, wherein the movement detection device is operable at a first sensitivity level and a second sensitivity level, wherein the second sensitivity level is higher than the first sensitivity level, wherein, during use, the zones of the area are scanned with the first sensitivity level when the object in the relevant zones is not detected and a zone is scanned with the second sensitivity level when the object in said zone is detected.

5. The system as claimed in claim 1, wherein the system comprises a self-learning means for determining a zone covering the passage of the area based on an observation where the object's presence detection always starts.

6. A lighting system comprising the presence detection system as claimed in claim 1, wherein the presence detection system is configured for initiating switching-on of a light of the lighting system when the presence of the object is determined, and the presence detection system is configured for initiating switching-off of the light of the lighting system when the object's presence is not detected.

7. A method for detecting a presence of an object within an area having a plurality of detection zones, the method comprising the steps of:
    detecting a movement of the object in one of the zones by a movement detection device,
    storing information relating to a position of the object in a zone-wise way by an electronic processing device based on a detected movement of the object, and
    determining the presence of the object within the area, in a zone-wise way, based on a detected movement and stored information relating to the position of the object by said electronic processing device,
    wherein the area comprises a passage, wherein the zones include a first zone covering the passage and a second zone adjacent to the first zone, and wherein the step of determining the presence of the object comprises:
    determining the presence of the object from a first moment in time when a movement in the first zone is detected,
    determining the presence of the object when a movement in one of the other zones is detected, and
    detecting a non-presence of the object when a movement from the second zone to the first zone is detected and thereafter no movement in the first zone is detected for a predetermined period of time.

* * * * *